Patented Aug. 24, 1937

2,091,183

UNITED STATES PATENT OFFICE 2,091,183

WATER SOLUBLE PHENOL-ALDEHYDE ADDITION PRODUCTS AND PROCESSES FOR MAKING THEM

John A. Murray and Arthur M. Howald, Toledo, Ohio, assignors, by mesne assignments, to Plaskon, Incorporated, a corporation of Delaware No Drawing. Application June 14, 1935, Serial No. 26,615

5 Claims. (Cl. 260—154)

The reactions which may take place when phenols and aldehydes are brought together are various and complex and may include addition reactions, condensation, and polymerization. The addition reactions and condensation may take place more or less concurrently. Phenol-formaldehyde addition products readily combine with each other forming condensation products and water, the condensation products being viscous liquids insoluble in water. When 1 mol. of phenol is treated with $n$ mols of formaldehyde an initial reaction forming an addition product of phenol and formaldehyde in 1:1 ratio is immediately followed under usual conditions by a condensation reaction between the molecules of the addition product, the condensation product thus formed being insoluble and having a tendency to polymerization rather than to combination with the remaining formaldehyde. The remaining formaldehyde thus usually fails to enter into the compound containing the phenol and either remains free or is transformed into formose-like products or other unwanted impurities. In processes conducted in accordance with this invention the occurrence of condensation is avoided while the addition reaction between the aldehyde and phenol proceeds to completion, the phenol and aldehyde as such disappear and water-soluble alcohols are produced.

It has been proposed to produce mixtures of phenol alcohols held in aqueous solution containing free formaldehyde and to produce also oily liquids believed to be phenol alcohols, but which are insoluble in water and are purified by washing with water; cf. U. S. Patent 1,614,171. The new products produced by our new process differ from such prior products in being miscible in all proportions with water while free of excess formaldehyde and in being stable at ordinary temperatures both while in solution and while free of solvents.

We accomplish the production of uncondensed and unpolymerized addition products, that is, of phenol alcohols, by carrying out the reaction between the aldehyde and phenol in the presence of a very large excess of base, such as heretofore has been regarded as deleterious, and by maintaining the solution, during the reaction, at temperatures below that at which condensation takes place in a strongly alkaline solution and yet high enough to promote the addition reaction, which we have found is not materially retarded by reduction of hydrogen ion concentration.

After the addition reaction is complete, the base is neutralized and removed. Others have heretofore employed alkaline solutions at the beginning of processes for making resins from phenol and aldehyde, but our invention is featured by the distinction that whereas such others have made their solutions acid by the addition of substances reacting with their bases to form soluble salts which were retained as seemingly unavoidable impurities in the final products, we neutralize the base in our solution by the addition of a substance forming a salt which is separated from the solution.

Because all of the base initially added is thus removed, we are enabled to utilize the base in quantities which are highly efficacious in preventing premature condensation, quantities which others have not dared to use because of the deleterious effect in the final product of salts formed in neutralizing their bases. Our solution being free from salts and free from water of solution, will keep for long periods without clouding or other deterioration.

Our process, described generally, comprises the following steps:

(a) Preparation of water-soluble addition products of phenol and formaldehyde (phenol alcohols) in a solution made strongly alkaline by the addition of a large quantity of base—e. g. KOH.

(b) Complete neutralization of the base by the addition of a chemically equivalent quantity of acid—e. g. $H_2SO_4$.

(c) Evaporation of the water of solution under vacuum.

(d) Addition of a solvent in which the salt formed by neutralization of the base is insoluble—e. g. acetone.

(e) Removal of the salt—e. g. by filtration or centrifugal action.

(f) Evaporation of the added solvent.

The resulting product is a mixture of pure phenol alcohols, the proportions of which are dependent upon the relative amounts of phenol and formaldehyde employed and the exact conditions under which the reaction takes place.

A molecule of phenol apparently combines initially with a molecule of formaldehyde to form an equimolecular addition reaction product. Then, under the strongly alkaline condition and low temperature of our solution, other molecules of formaldehyde are progressively taken up by the addition reaction product until the free formaldehyde is all combined. Some molecules of the addition reaction product capture more molecules of formaldehyde than others; hence a mixture of alcohols results. The affinity of the addition reaction molecules for free formaldehyde seems, however, to become less with successive captures, so that phenol alcohols having intermediate molecular ratios predominate in the mixture. The phenol may be treated with $n$ mols of formaldehyde, depending upon which phenol alcohol is desired in preponderance. We have found that treatment with from 1½ to 3 mols according to our process gives mixtures which are clear liquids of low viscosity, mobile at ordinary temperatures and which are soluble in water and in organic solvents and which will keep for several weeks without appreciable deterioration. The phenol alcohols made according to our process may be employed for various purposes, among which is the manufacture of coatings and other plastics.

As a specific example of the process of our invention, 1520 grams of phenol, 3400 grams of 37% formalin (2.6 mols) and 609 grams of potassium hydroxide and 34% aqueous solution are mixed in the order listed and maintained at 30° centigrade for a period of from twenty-four to forty-eight hours. The addition reaction between the phenol and formaldehyde will be substantially complete at the end of thirty-six hours, but the solution may be kept standing at 30° centigrade for the remainder of a forty-eight to ninety-eight hour period without appreciable premature condensation.

After the initial reaction period, 532 grams of sulfuric acid in 30% solution is added. This is sufficient to just neutralize the potassium hydroxide by combining therewith to form potassium sulfate which is precipitated in the form of crystals that are insoluble in the phenol-formaldehyde reaction products. The solution then is concentrated by evaporation, preferably but not necessarily under vacuum, to remove most of the water and to augment precipitation of the potassium sulfate, care being taken to keep the temperature low enough to prevent condensation. The phenol alcohols, when alkaline, are unstable in color, and the addition of a small amount of an organic acid makes it possible to get rid of the water of solution without discoloration. The mixture then is thinned with acetone, in which potassium sulfate is insoluble, to insure more complete separation of the crystalline potassium sulfate and to make filtration easier; the crystalline aggregate is removed, and finally the acetone and remaining water of solution are evaporated. Analysis of the phenol alcohol mixture thus obtained showed less than .03% of inorganic matter.

In the foregoing example, approximately 40% by weight of KOH is employed, and the use of such relatively large quantities of base and of relatively low temperatures, approximating 30° C., is preferable from the standpoint of ease and certainty of control. The process can, however, be carried out with the use of a base which, when neutralized, will form a separable crystalline aggregate, the base corresponding in quantity to as little as 5% by weight of KOH as compared with the weight of phenol. With such smaller quantities of base, higher temperatures are desirable to bring about reaction within reasonably short periods of time, but even when base in quantity corresponding to as little as 5% by weight of KOH, as compared to the weight of phenol, is employed, the temperature at which the initial reaction takes place should not exceed 55° C.

The process and product herein described are to be regarded as illustrative only, and it is to be understood that our invention is susceptible to variation, modification and change within the spirit and scope of the subjoined claims.

Having described our invention, we claim:

1. A process for producing phenol alcohols which comprises the steps of forming phenol-formaldehyde addition products in a solvent, the solution being sufficiently basic and at temperatures low enough so that condensation of such addition products is prevented during the period of their formation, neutralizing such solution by the addition of a substance combining with the base component to form a separable aggregate, removing such separable aggregate from the solution, and evaporating the solvent.

2. A process for producing phenol alcohols which comprises the steps of forming phenol-formaldehyde addition products in a solvent, the solution being sufficiently basic and at temperatures low enough so that condensation of such addition products is prevented during the period of their formation, neutralizing such solution by the addition of a substance combining with the base component to form a separable aggregate, removing such separable aggregate from the solution, and evaporating the solvent in the presence of a small amount of an organic acid.

3. A process for producing phenol alcohols which comprises the steps of forming phenol-formaldehyde addition products by combining phenol and formaldehyde in the ratio of approximately 1 mol. phenol to 2.6 mols formaldehyde in a solvent containing a soluble base in quantity corresponding to at least 5% by weight of KOH as compared with the weight of phenol, permitting the solution to stand at a temperature not exceeding 55° centigrade until substantially all the formaldehyde has been combined, neutralizing the solution by the addition of a substance combining with the base to form a separable aggregate, removing such separable aggregate from the solution, and evaporating the solvent.

4. A process for producing phenol alcohols which comprises the steps of forming phenol-formaldehyde addition products by combining phenol and formaldehyde in a ratio of approximately 1 mol. phenol to 2.6 mols formaldehyde in a solvent containing a soluble base in quantity corresponding to approximately 40% by weight of KOH as compared with the weight of phenol, permitting the solution to stand at a temperature not exceeding 55° centigrade until substantially all the formaldehyde has been combined, neutralizing the solution by the addition of a substance combining with the base to form a separable aggregate, removing such separable aggregate from the solution, and evaporating the solvent.

5. A process for producing phenol alcohols which comprises the steps of forming phenol-formaldehyde addition products by combining phenol and formaldehyde in a ratio of approximately 1 mol. phenol to 1½ to 3 mols formaldehyde in a solvent containing approximately 40% by weight of KOH as compared with the weight of phenol, such solution being allowed to stand at a temperature of approximately 45° centigrade until substantially all the formaldehyde is combined, neutralizing said solution by the addition of a chemical equivalent of $H_2SO_4$ to form $K_2SO_4$, removing the $K_2SO_4$ from the solution, and evaporating the solvent.

JOHN A. MURRAY.
ARTHUR M. HOWALD.